March 2, 1965
V. E. HENLEY ETAL  
METHOD OF AND MEANS FOR FORMING THE BEAD  
PORTIONS OF PNEUMATIC TIRES
3,171,769
Filed June 27, 1962
6 Sheets-Sheet 1
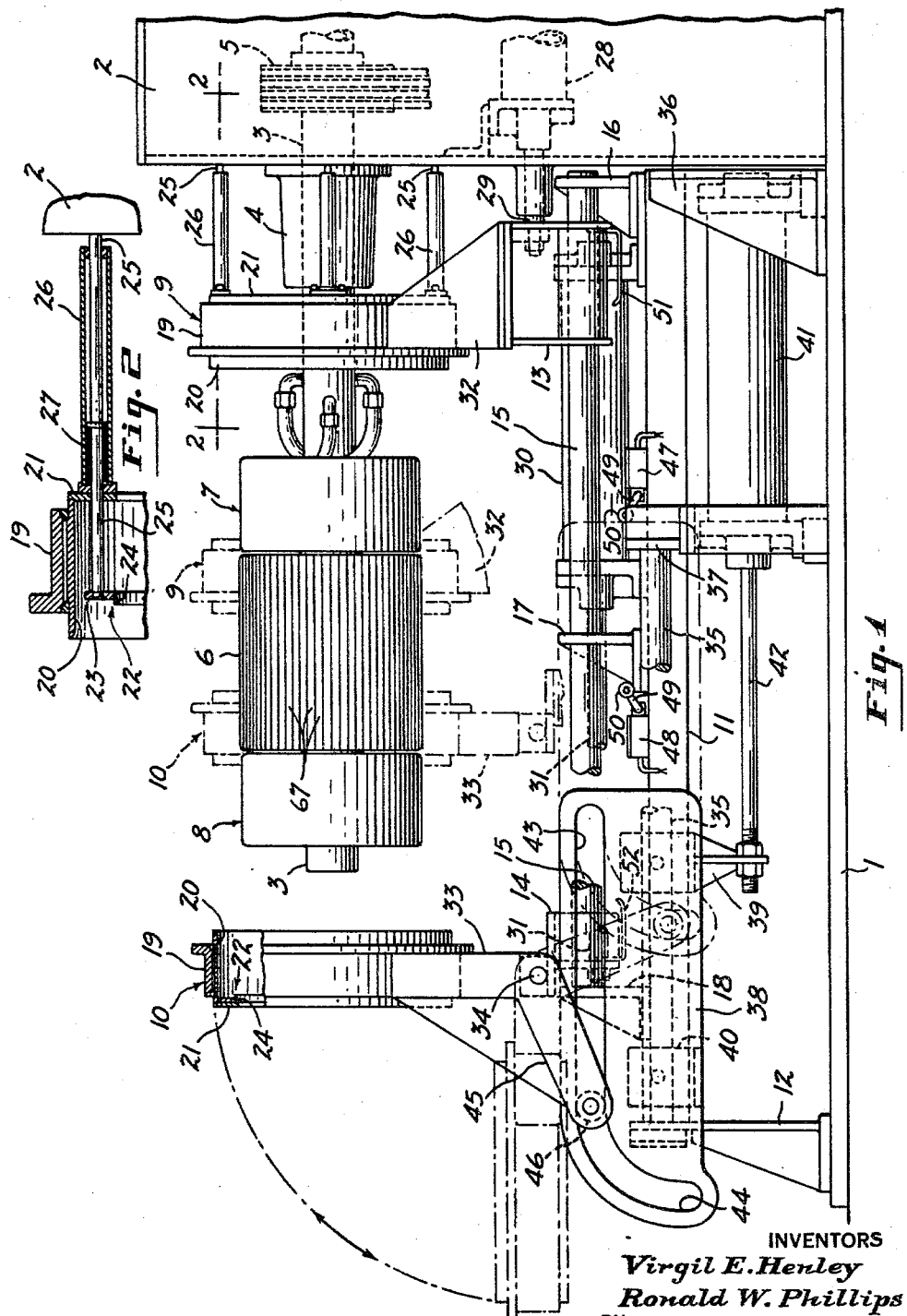
INVENTORS
*Virgil E. Henley*
*Ronald W. Phillips*
BY
ATTORNEYS

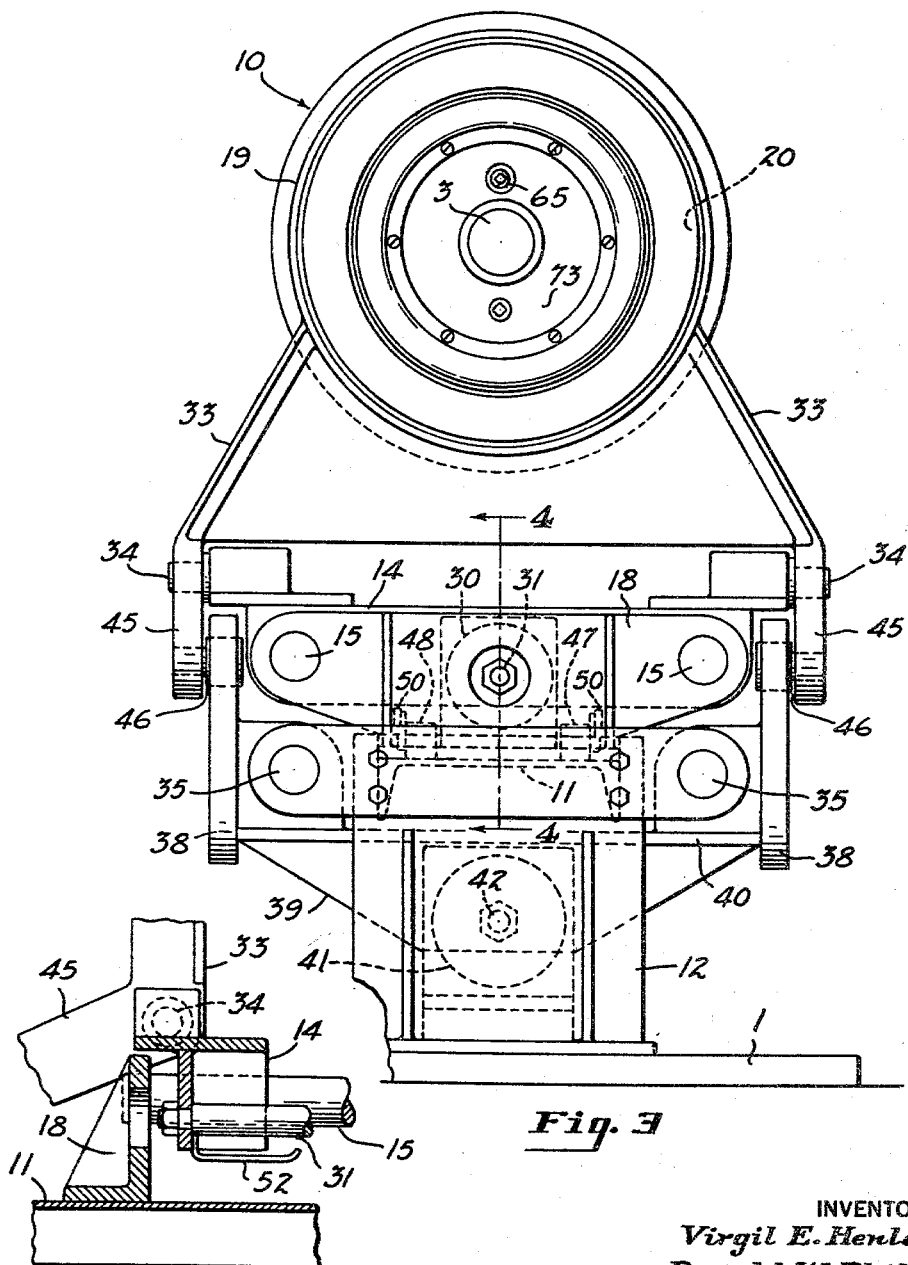

March 2, 1965 V. E. HENLEY ETAL 3,171,769
METHOD OF AND MEANS FOR FORMING THE BEAD
PORTIONS OF PNEUMATIC TIRES
Filed June 27, 1962 6 Sheets-Sheet 3
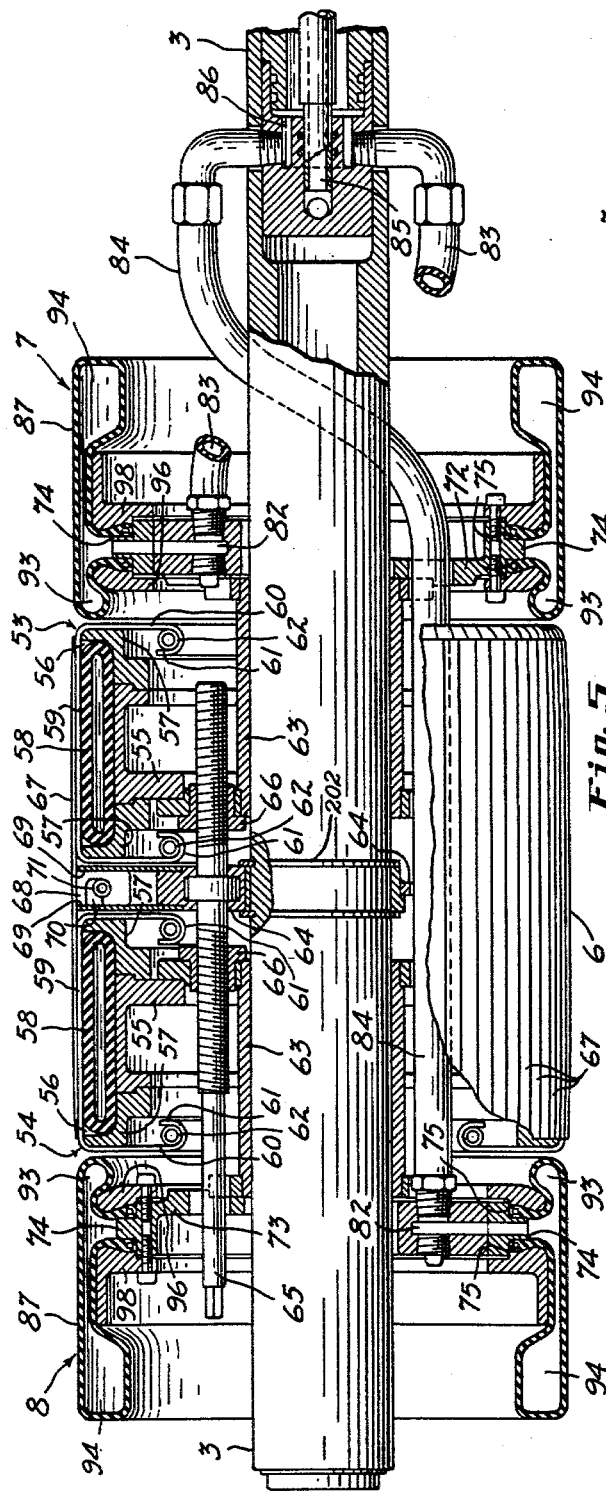
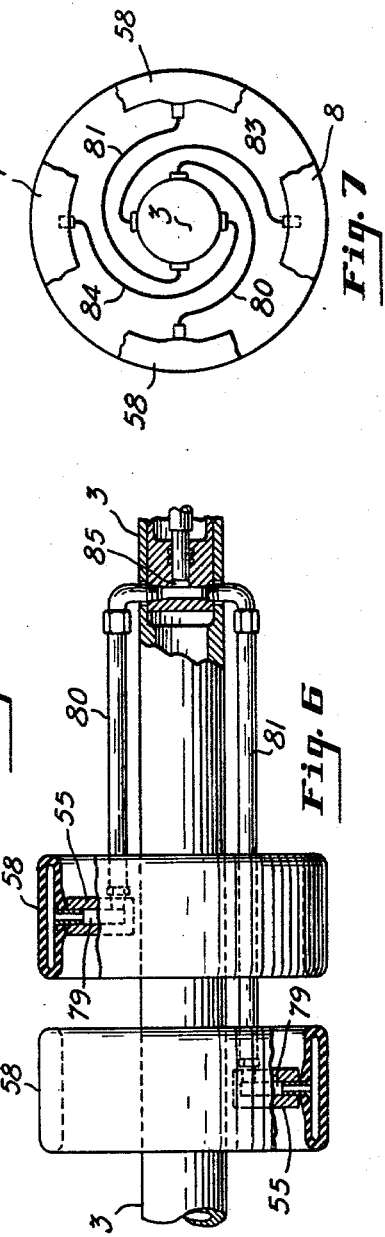
INVENTORS
*Virgil E. Henley*
*Ronald W. Phillips*
BY
ATTORNEYS INVENTORS
Virgil E. Henley
Ronald W. Phillips
BY McCoy, Greene & Te Grotenhuis
ATTORNEYS INVENTORS
Virgil E. Henley
Ronald W. Phillips
BY McCoy, Greene + TeGrotenhuis
ATTORNEYS

United States Patent Office 3,171,769
Patented Mar. 2, 1965

3,171,769
METHOD OF AND MEANS FOR FORMING THE BEAD PORTIONS OF PNEUMATIC TIRES
Virgil E. Henley, Akron, and Ronald W. Phillips, Tallmadge, Ohio, assignors to The General Tire & Rubber Company, Akron, Ohio, a corporation of Ohio
Filed June 27, 1962, Ser. No. 205,683
9 Claims. (Cl. 156—132)

This invention relates to tire building machines and more particularly to the method of and means for forming the bead portions of a fabric reinforced pneumatic tire.

The present invention is applicable to a tire building machine which includes a tire building drum to which a band consisting of a plurality of superposed plies of cord fabric may be applied which has end shoulders against which edge portions of the band may be pressed and comprises means for applying bead rings to the portions of the band which overhang the shoulders of the drum and for folding the edges of the ply band over the bead rings.

The tire building machine of the present invention is provided with two identical inflatable ply turnover bags mounted at opposite ends of the drum. The turnover bags are reinforced with cord fabric and are vulcanized to a transversely elongated tubular form that provides exterior faces of a diameter enough less than that of the building drum to permit bead rings to be passed over the uninflated bags into engagement with the portions of the ply band overlying the drum shoulder.

Axially movable bead ring carriers are provided for supporting bead rings coaxially with respect to the drum and for pressing said rings against the portions of the ply band overlying the drum shoulders. The bead ring carriers are also provided with air bag engaging sleeves of substantially cylindrical form that are coaxial with the drum and that have an internal diameter greater than the external diameter of the drum when expanded and materially less than the external diameter of the turnover bags when they are fully inflated. The carriers for the bead ring supports and turnover sleeves are movable axially to and from a position clear of the drum and ply turnover bags. The bead ring carriers are actuated after expansion of the drum and before inflation of the turnover bags to press the bead rings axially against the fabric overlying the drum shoulders to position the rings around the expansible turnover bags. After application of the bead rings the bead ring carriers are moved to their retracted positions and the inflatable bags are inflated to press the ply bands against the interiors of the bead rings and to expand the edge portions of the bands and fold the same radially outwardly adjacent to the exterior faces of the bead rings. After inflation of the turnover bags the carriers are again moved axially toward the ends of the drum to engage the inflated bags and force the outer portions thereof axially over the drum shoulders.

The inflatable bags are reinforced by superposed plies of cord fabric which serve to prevent transverse stretching of the annular bags and to maintain a predetermined transverse perimeter. The inflatable bags are built upon a cylindrical drum in the same manner as a pneumatic tire carcass. The body of the band comprises the superposed plies of cord fabric having their cords disposed in crossing relation and anchored to inextensible bead rings at opposite edges of the fabric bands. Interior and exterior layers of rubber cover the fabric and, after forming on a cylindrical drum, the cylindrical rubber and fabric band is expanded in a vulcanizing mold having a transversely elongated annular mold cavity to which the annular body of the bag is forced to conform by internal air pressure.

The bags at opposite ends of the drum are identical and each has radially spaced exterior and interior wall portions the exterior wall portion being preferably of substantially cylindrical form. The two beads of the bag are disposed close together and laterally of the median plane of the bag, one of the interior wall portions being narrow and the other interior wall portion being of a width more than one-half the width of the annular bag. When the cylindrical band from which the bag is shaped is placed in the vulcanizing mold a portion thereof is expanded radially outwardly against the cylindrical exterior wall of the mold cavity to form the exterior wall of the bag and other portions of the band are pressed radially inwardly against interior wall portions of the mold cavity. Each ply turnover bag is mounted closely adjacent an end of the drum with its beads between its median plane and the end of the drum and its narrow inner wall portion between the beads and the drum.

The expansion characteristics of the turnover bag are determined in part by the cross sectional form to which the bag is vulcanized and in part by the disposition of the reinforcing cords.

Inflation pressure tends to cause the bag to assume a toroidal form in which the cross sectional shape from bead to bead is substantially circular and in which the toroid is centered with respect to the beads. The cross sectional shape of the bag is such that during the initial portion of the expansion thereof by inflation pressure the exterior wall moves radially outwardly and presses the ply band against the interior of the bead ring. After this initial expansion the axially outer portion of the bag, due to the shape in which it was vulcanized, causes the inflation pressure to exert a strong axial outward pull on the portion of the bag engaging the ply band while the bag is being expanded to draw the ply band tightly against the bead ring while it is being folded radially outwardly. As the bag is approaching its maximum external diameter the axial inward component force of the air against the interior of the bag overbalances the axial outward component of said force and the inflated bag wall shifts bodily axially inwardly and presses the ply band against the outer side face of the bead ring.

In order to provide a strong axial outward pull on the bag wall, an enlargement of the tubular bag cavity is provided by decreasing the inner diameter along the axially outer edge thereof. Because of this configuration of the bag, the force exerted by the air results in an axial outward movement of the bag after an initial axially balanced expansion. Outward axial movement of the inner edge portion of the bag is delayed so as to cause the bag to press the fabric band tightly against the interior of the bead ring by providing an enlargement in the bag cavity along the interior edge of the bag.

The bag, when uninflated, assumes the form to which the bag was vulcanized. The exterior wall portion of the uninflated bag must be of a diameter throughout its width small enough to permit a bead ring to be passed over it. It is convenient to make this wall portion cylindrical but such form is not essential. The enlargements in the annular bag cavity are formed by increasing the radial distance between the exterior and interior wall portions of the bag adjacent inner and outer edges thereof. By disposing the major portion of the bag wall axially outwardly of the beads a strong resistance to radial expansion and to axial inward movement is maintained until the bag has been expanded to near its maximum external diameter, at which time the axial inward component of the thrust due to the offsetting of the beads overbalances the axial outward component and shifts the bag toward the end of the drum.

The cord reinforcement in the bag wall is disposed at a small bias angle preferably not more than 10°, it being understood that cords in the cylindrical exterior wall would have a 0 bias angle if parallel to the axis of the bag. Cords disposed at a small bias angle serve to resist lateral stretching of the bag wall but offer only slight resistance to lateral shifting of the bag wall, so that the lateral shifting movement of the bag wall during inflation is controlled mainly by the shape to which the bag wall is vulcanized.

When the outer portion of the bag wall is fully expanded the edge of the ply band is folded outwardly and pressed axially against the outer side face of the bead ring.

After the full inflation pressure is applied the bag turnover sleeve is moved axially into engagement with the bag to turn the same over the drum shoulder. Simultaneously with the engagement of the turnover sleeve with the inflatable bag or very shortly thereafter, a valve is opened to allow escape of air from the bag. The turnover sleeve is moved axially by means of a fluid motor so that the rate of movement of the sleeve is governed by the rate of decrease of pressure in the bag.

As the radially outer portion of the inflated bag is being forced over the drum shoulder and confined between the interior of the turnover sleeve and the exterior of the drum, the volume of air in the bag is being reduced and by providing a bleed passage of the proper cross sectional area the rate of escape of air may be so regulated that the air pressure within the bag is not substantially reduced until the turnover movement of the sleeve is completed.

During the final portion of the turnover operation, the portion of the bag engaging the turned back edge of the ply band is pressed radially against the ply band and drum, not only by the air pressure but also by the contractile force due to the large amount of potential energy stored up in the rubber of the wall by stretching. As the pressure is reduced the potential energy stored up in the portion of the bag wall engaging the interior of the turnover sleeve is released and causes this portion of the wall to snap radially into engagement with the portion of the wall engaging the ply band to hold the bag on the drum and maintain a uniform radial pressure to the turned over edge of the ply band throughout the circumference of the drum.

After the turnover sleeve has been retracted the bag may be released from the drum by admitting air under pressure to the interior of the bag sufficient to expand the portion of the bag overlying the drum, whereupon the bag will spring back to its original position free of the drum.

The beads of the bags are clamped to narrow peripheral portions of supports attached to the hub of the main drum so that the turnover bags are mounted in fixed position with respect to the drum. The drum is mounted on a shaft that is supported cantilever fashion from a suitable support. One of the annular bead applying and turnover members is mounted between the drum and the shaft supporting housing in a position coaxial with the drum for movement axially toward and away from the inner end of the drum. The outer annular bead applying and turnover member is supported on an axially movable carrier and is pivotally mounted on the carrier for movement from a vertical position coaxial with the drum to a horizontal position below the drum to permit removal of a tire after it has been built on the drum.

The outer bead applying member has a bead ring supporting annulus that is fixed with respect to the pressure applying plate of the turnover annulus and the bead ring can be readily applied to its support when the annulus is swung downward to its horizontal position. The inner bead ring has to be moved axially over the drum and placed by hand on the support provided on the inner bead applying and turnover member. In order to provide effective means for pressing the rings against the tire shoulders, the bead ring supporting annulus is engaged by the backing plate of the turnover annulus which is disposed at the end of the bag engaging sleeve that is remote from the drum. To provide for more convenient manual insertion of the bead rings in the inner band applying and turnover annulus, the bead ring supporting member is mounted for axial movement within the turnover sleeve of the inner bag engaging annulus and means is provided for moving the bead ring supporting member to a position adjacent the inner edge of the turnover sleeve when the inner turnover annulus is in its retracted position. The bead supporting ring is normally held by means of springs against the backing plate and is supported by a series of slidable rods which project past the backing plate a distance corresponding to the length of the back engaging sleeve so that as the backing plate approaches the housing the rods engage the wall of the housing and move the bead support axially to adjacent the open end of the sleeve where it is conveniently disposed to receive the bead ring.

Since the bead applying and ply turnover members are subjected to considerable pressure during the bead applying and turnover operations, it is desirable that the outer annulus be rigidly braced during the pressure applying operations. In the machine of the present invention the outer annulus is braced during its movements toward the drum by means of outwardly and downwardly inclined members rigidly attached to the annulus and supported at their lower ends by rollers that travel in horizontal slots in rigid parallel plates. Means are provided to swing the outer annulus downwardly to its inoperative position when it is at its outer limit of movement. The slotted plates are so positioned that the rollers engage the horizontal slots throughout the entire axial movement of the annulus and, for moving the annulus about its pivot, the outer ends of the slots have downwardly curved portions which are normally positioned outwardly of the rollers in the outermost position of the annulus. Means are provided for shifting the plates axially toward the drum far enough to engage the downwardly curved portion of the slots with the rollers and swing the annulus to horizontal position.

Reference should be had to the accompanying drawings forming part of this specification, in which:

FIGURE 1 is a side elevation of a tire building machine embodying the invention;

FIG. 2 is a fragmentary section on an enlarged scale taken on the line indicated at 2—2 in FIG. 1;

FIG. 3 is an end elevation of the machine looking toward the free end of the drum;

FIG. 4 is a fragmentary section taken on the line indicated at 4—4 in FIG. 3;

FIG. 5 is a longitudinal section on an enlarged scale through the tire building drum and the inflatable turnover bags;

FIG. 6 is a diagrammatic view showing the air connections to the inflatable drum expanding bags;

FIG. 7 is a diagrammatic view showing the arrangement of air tubes adjacent their connection to the air ducts in the drum shaft inwardly of the drum;

FIG. 10 shows the bead ring and turnover bag prior to inflation of the bag;

FIG. 11 shows the turnover bag at the stage of inflation where it presses the ply band against the interior of the bead ring;

FIG. 12 shows the bag at the stage of inflation where it exerts an axial outward pull on the ply band;

FIG. 13 shows the bag subjected to substantially full inflation pressure and pressing the end of the ply band against the outer face of the bead;

FIG. 14 shows the bag being forced axially over the periphery of the drum by the turnover sleeve;

FIG. 15 shows the bag collapsed upon the periphery of the drum;

Figure 8:
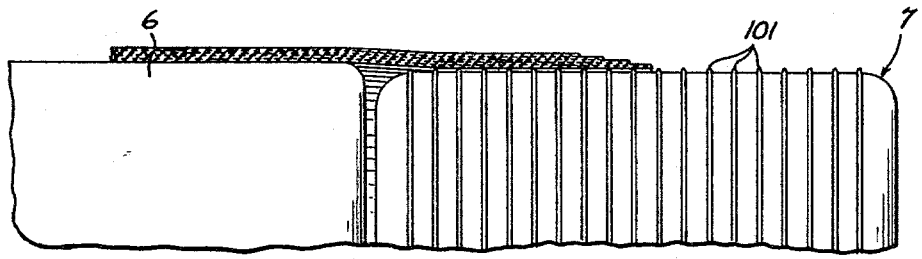
FIG. 8 is an end of the fabric band that has been applied to the drum before expansion of the drum.

In the accompanying drawings the invention is shown applied to a tire building machine of the type shown in the patent to Kraft No. 2,614,952, granted October 21, 1952. In this type of machine the drum is expanded after the fabric band has been applied so as to cause ends of the band to overhang the drum shoulders. It is, however, immaterial in so far as the present invention is concerned whether the fabric band be so applied or whether the edges of the band are pressed radially inwardly and against the drum shoulders.

As herein shown the tire building machine has a base 1 and a vertically extending housing 2 positioned at one end of the base. A drum shaft 3 is supported at both ends of the housing 2 and extends horizontally from the housing above the base 1. The housing 2 is provided with bearings, only one of which, 4, shows. The shaft 3 may be rotated by means of a pulley 5 and suitable driving members extending over the pulley. The shaft 3 has a sleeve 202 mounted thereon. A tire building drum 6 is in turn mounted on the sleeve. At the ends of the drum externally cylindrical, inflatable ply band turnover air bags 7 and 8 are provided. The drum 6 is cylindrical and of greater diameter than the bags when expanded, so that its end shoulders are disposed radially outwardly of the bags 7 and 8.

Inner and outer annular bead applying members 9 and 10 are mounted for axial movement toward and away from the ends of the drum. The bead applying members 9 and 10 are supported upon a longitudinal channel-shaped beam 11 extending horizontally beneath the drum shaft 3. The beam 11 extends outwardly from the housing 2 and is supported at its outer end by means of a bracket 12 on the base 1. The axially movable annuli 9 and 10 are supported by carriages 13 and 14 that are slidably mounted on parallel horizontal guide rods 15 supported by a bracket 16 carried by the beam 11 adjacent the housing 2, a bracket 17 intermediate the ends of the beam and a bracket 18 adjacent the outer end of the beam 11.

Each of the bead applying members 9 and 10 has a rigid supporting ring 19 which fits around the exterior of a bag engaging sleeve 20 which is of substantially cylindrical form. A flat annular plate 21 is rigidly attached to the end of each sleeve 20 that is remote from the drum 6 and extends radially inwardly from the sleeve. Each annulus carries a circular bead ring supporting member 22 that has a flat annular body 23 and a thin cylindrical flange 24 narrower than the bead ring that projects from the inner edge of the annular body 23 toward the drum 6. As shown in FIG. 1, the bead ring support is rigidly attached to the inner face of the plate 21 of the outer bead applying member 10. As shown in FIGS. 1 and 2 the bead supporting member of the inner bead applying member 9 is supported by a series of circumferentially spaced, horizontally disposed rods 25 that are axially slidable in the backing plate 21 of the inner annulus 9. An elongated cylindrical guide member 26 is provided for each of the supporting rods 25 and each of these guide members is rigidly attached to and projects rearwardly from the plate 21. Within each of the guide members 26 there is provided a coil spring 27 which exerts a rearward pressure on the rod 25 for holding the bead supporting annulus against the plate 21.

During movement of the annulus 9 towards the housing 2 the inner ends of the rods 25 engage the wall of the housing and move the bead carrying annulus to the position shown in FIG. 2. When the annulus 9 is moved toward the drum the springs 27 exert pressure on the rods 25 to hold them in engagement with the housing 2 until the plate 23 is brought into engagement with the plate 21 so that the bead rings are firmly pressed against the drum shoulders when the bead applying members 9 and 10 are moved to the positions shown in dotted lines in FIG. 1.

A cylinder 28 within the housing 2 has a piston 29 parallel to the shaft 3 which is attached at its outer end to the carriage 13 which supports the inner annulus 9. A cylinder 30 mounted on the beam 11 has a piston 31 attached to the carriage 14 that supports the outer annulus 10. The inner annulus 9 is secured to the carriage 13 by means of a bracket 32 that is rigidly attached to the ring 19 and the carriage 13. The outer bead applying annulus 10 is supported by a bracket 33 rigidly attached to the ring 19 and connected to the carriage 14 by means of a horizontal pivot 34.

A pair of horizontal guide rods 35 are mounted below and parallel to the guide rods 15. The rods 35 are supported at their outer ends in the bracket 12, at their inner ends in a bracket 36 adjacent the housing 2 and intermediate their ends in a bracket 37, the brackets 36 and 37 being supported on the base 1. A pair of rigid cam plates 38 are supported on opposite sides of the carriage 14 and are attached to inner and outer carriers 39 and 40 that slide on the rods 35. A cylinder 41 mounted on the base 1 is provided with a piston 42 that is attached to the inner carrier 39 for shifting the cam plates 38 axially away from or toward the housing. Each of the cam plates 38 is provided with a horizontal slot 43 which extends the major portion of the length of the plate and which has a downwardly curved portion 44 adjacent the outer end of the plate. The bracket 33 has downwardly and rearwardly extending portions 45 which carry axially alined rollers 46 that travel in the slots 43 of the cam plates. When the cam plates 38 are in their outermost positions as shown in FIG. 1, the outer bead applying annulus 10 is held in its vertical position at its outer limit of movement so that the member 10 may be moved from the full line position in FIG. 1 to the dotted line position while it is rigidly held in upright position. When the bead applying member 10 is in its fully retracted position it may be swung rearwardly to the horizontal position shown in dotted lines in FIG. 1 by actuating the cylinder 41 to pull the cam plates 38 inwardly toward the housing, causing the rollers 46 to travel downwardly in the curved portions 44 of the cam slots.

Figure 9:
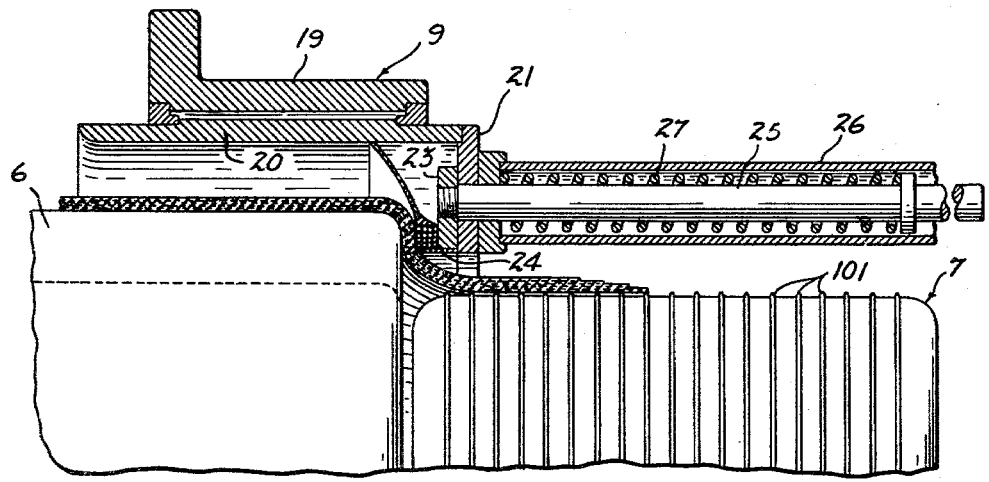
FIG. 9 shows the drum expanded and a bead ring being applied to a portion of the fabric band overlying the drum shoulder.

The bead applying and turnover members 9 and 10 are first actuated to press the bead rings against the portion of the ply band overlying the drum shoulders, as shown in FIG. 9 of the drawings, this position of the bead applying members being shown in dotted lines in FIG. 1. After the application of the bead rings the bags 7 and 8 are inflated to the position shown in FIG. 13 and the members 9 and 10 are moved axially toward the drum to force the bag over the end of the drum and complete the ply turnover operation. During the bag squeezing operation it is desirable to limit the axial inward movement of the members 9 and 10 and, to this end, a pair of limit switches 47 and 48 are mounted on the beam 11 to automatically stop the carriages 13 and 14. Other control methods such as automatic timers may also be used. Each switch has a pivoted arm 49 carrying a roller 50 and the rollers 50 of the two switches are engaged by cam plates 51 and 52 attached to the under sides of the carriages 13 and 14. During the bead applying operation the relays in which the limit switches 47 and 48 are located are deenergized so that the members 9 and 10 can press the bead rings against the drum shoulders. During the second axial movement of the members 9 and 10 the relays of switches 47 and 48 are energized to limit the axial movements of the members 9 and 10 toward the drum 6.

As shown in FIG. 5 of the drawings, the drum 6 may be provided with axially adjustable end sections 53 and 54 which may be of identical construction, each having a rigid body portion 55 and a channel-shaped peripheral portion 56 which is somewhat wider than the body portion 55 to provide internal shoulders 57 at opposite sides thereof. Mounted within the peripheral channel 56 of each of the sections 53 and 54 is a normally flat annular, inflatable tube 58 which serves to expand the cylindrical peripheral portion of each drum section. The cylindrical periphery of each section is formed by narrow, thin metal segments 59 which substantially abut edge to edge when the segments are in their radially innermost positions. Each segment 59 has end portions 60 that are disposed at right angles to the central portion of the segment and that extend radially inwardly. The inturned end portions 60 terminate in inwardly extending hooks 61 that provide support for endless garter springs 62 that serve to normally hold the segments in their innermost positions in engagement with the rigid body portion of the drum sections. Each of the drum sections has a hub 63 that is slidable on the shaft 3. A disk 64 is fixed to the sleeve 202 between the sections 53 and 54 and the disk carries a screw shaft 65 that is parallel to the shaft 3 which is provided with oppositely threaded portions that engage with nuts 66 fixed to the rigid body portions 55 of the drum sections. The drum sections are constrained to turn with the shaft by reason of their engagement with the screw shaft carried by the disk 64 and by turning the shaft 65 the two sections can be moved simultaneously toward or away from the central disk 64.

A bridging band having telescopic engagement with the end sections 53 and 54 comprises closely spaced narrow axially extending segments 67 which substantially abut edge to edge in the contracted position of the drum. The segments 67 are rigidly attached to segmental blocks 68 which abut edge to edge circumferentially in the contracted position of the drum and which are held in a position centered with respect to the end sections by flat annular plates 69 attached to the central disk 64 and projecting radially outwardly past the periphery thereof. The blocks 68 are provided with circumferentially registering slots 70 which open to a side face thereof and which provide support for an annular garter spring 71 that maintains a radial inward thrust on each of the segments 67. The ply turnover bags are supported on disks 72 and 73 that are attached at outer ends of the hubs 63 of the drum sections and each of the disks 72 and 73 is provided with a narrow peripheral rib 74 and cylindrical seats 75 on opposite sides of the rib.

Figure 17:
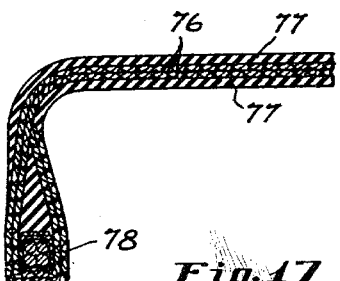
FIG. 17 shows a bead portion of the ply turnover bag as formed on a cylindrical drum prior to molding and vulcanizing.

Each of the inflatable bags has its flexible wall formed of superposed cord fabric plies 76 covered interiorly and exteriorly with layers of rubber 77 as shown in FIG. 17. The ply turnover bags have inextensible beads reinforced with bead rings 78 which are enclosed within edge portions of the cord fabric in the same manner as the bead rings of a pneumatic tire. The bags may be built on a cylindrical tire building drum by applying the layers of fabric and rubber to the drum and folding the edges of the fabric band about the bead ring. The cylindrical rubber and fabric band so formed is then placed in a vulcanizing mold and forced by internal air pressure to conform to the interior of the mold cavity. The bag when molded and vulcanized has the form shown in FIG. 10 of the drawings, the bead rings being disposed close together and laterally of the median plane of the bag and the bag having an axially elongated tubular form in cross section. The bags 7 and 8 are fastened to the peripheries of the disks 72 and 73 with their beads fitting upon the cylindrical shoulders 75 on opposite sides of the central ribs 74.

As shown in FIG. 6 of the drawings, tubes 80 and 81 deliver air under pressure to the drum expanding tubes 58 and the bag supporting disks 72 and 73 are provided with radial passages 82 which receive air under pressure from conduits 83 and 84. Air under pressure for expanding the drum and ply turnover bags is delivered to the conduits 80, 81 and 83, 84 through passages in the shaft 3, a central passage 85 being provided which opens to the conduits 80 and 81 and an annular passage 86 surrounding the passage 3 delivering to conduits 83 and 84.

Figure 10:
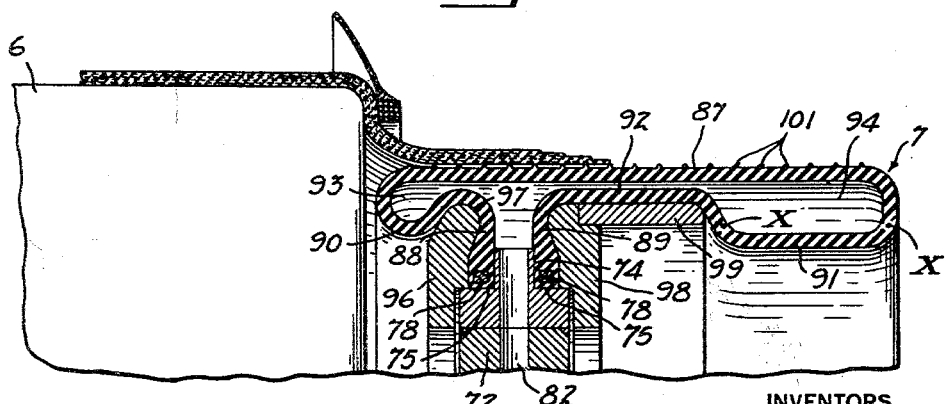
FIGS. 10 through 15 show successive stages of the ply folding operation.

As best shown in FIG. 10, each ply turnover bag has a cylindrical outer wall portion 87 which extends substantially the full width of the bag. Interiorly thereof the bag has short, substantially vertical portions 88 and 89 extending radially outwardly from the beads that are seated on the shoulders 75 of the supporting disk. The interior wall portion extending from the inner vertical portion 88 toward the drum 6 has a narrow inwardly contracted portion 90 and the wider interior wall portion extending axially outwardly from the vertical portion 89 has an edge portion 91 adjacent its outer edge which is also contracted radially inwardly. Between the contracted portion 91 and the vertical portion 89 the outer interior wall portion has a cylindrical portion 92. The interior wall portions are spaced radially inwardly from the exterior wall portion 87 and the inwardly bulged portions 90 and 91 provide enlargements 93 and 94 of the air space within the tube.

An inner clamping ring 96 fits upon the inner shoulder 75 and clamps the inner bead against the rib 74. The clamping ring 96 has a rounded peripheral edge 97 that conforms to the interior wall of the tube between the inwardly contracted portion 90 and the inner vertical portion 88. An outer clamping ring 98 fits upon the outer shoulder 75 and clamps the outer bead of the bag against the rib 74, the outer clamping ring 98 having a cylindrical flange 99 that engages the interior of the interior cylindrical portion 92 of the bag.

Figure 16:
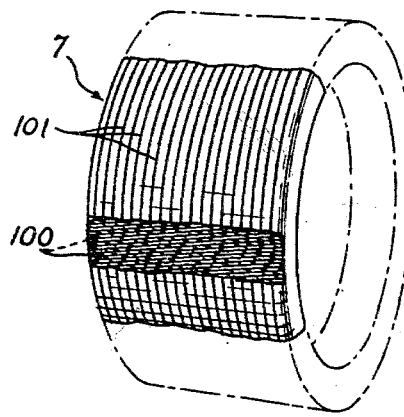
FIG. 16 shows the angularity of the cords in the fabric ply band and the slip resisting exterior face of the turnover bag.

As shown in FIG. 16, the reinforcing plies 76 have cords 100 disposed at a small bias angle, not greater than about ten degrees and preferably about five degrees, it being understood that the bias angle is measured with respect to a transverse plane in which the axis of the bag lies. The cord fabric reinforcement restricts transverse stretching of the bag wall upon inflation and, by reason of their low bias angle, the cords offer relatively slight resistance to lateral deflection of the bag wall.

Figure 11:
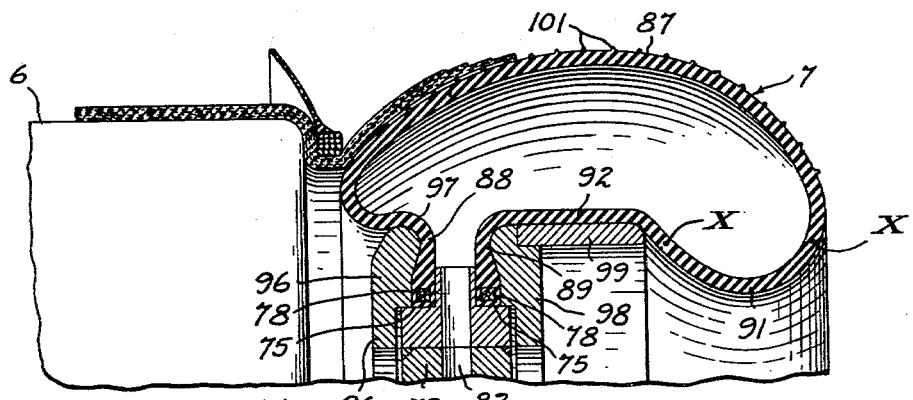
Figure 12:
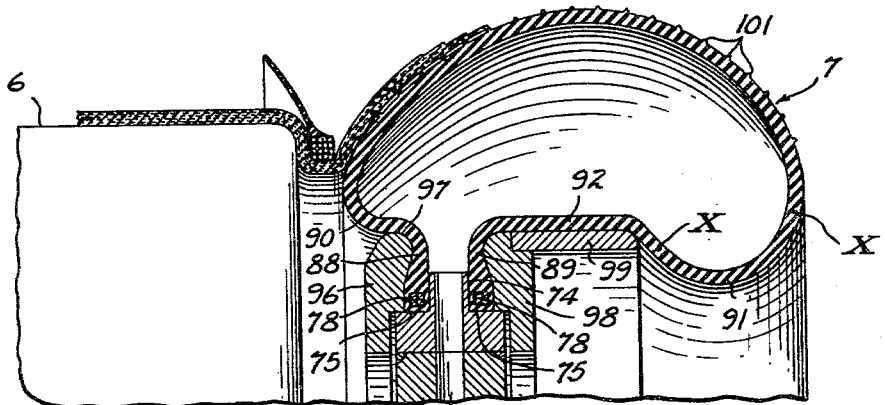
Figure 13:
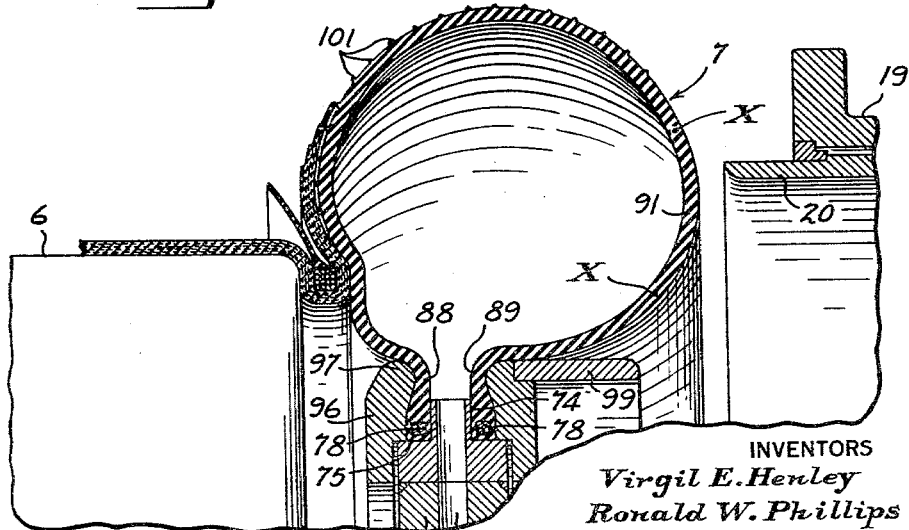

The expansion characteristics of the bag during inflation is illustrated in FIGS. 10 to 13. The enlargement 94 of the annular bag cavity adjacent its axially outer edge causes a considerable portion of the expansive thrust of the air during the initial portion of the inflation to be exerted in an axial outward direction and the contraction of the portion 91 of the interior wall causes the cords 100 to be crowded closer together so that the portion 91 exerts substantially greater resistance to radial expansion than the exterior wall portions, so that the bag wall is shifted axially outwardly during the initial portion of the inflation as shown in FIG. 11. As the internal air pressure is increased to near the full inflation pressure the portion 91 of the bag wall offers progressively decreasing resistance to inward movement of the bag wall and the axial inward component of the expanding thrust on the interior of the bag wall increases until it overbalances the axial outward component of said thrust and the bag wall is shifted axially inwardly toward a position centered with respect to the beads 78 and against the drum shoulder as shown in FIG. 13.

After a bead ring has been applied to the end of a fabric band that has been turned inwardly over the drum shoulder either by expanding the drum after the band has been applied thereto, or by shrinking the end of the band, the bag 7 is inflated and the end portion of the ply band is folded over the bead ring as illustrated in FIGS. 12–15. Since the expansion and contraction characteristics of the turnover bag are due largely to the portion 91 of the bag wall, the position of the portion 91 in the bag wall is shown by the dots designated by the letter X in FIGS. 10 to 15 inclusive. During the initial portion of the expansion of the bag, the inner enlargement 93 of the bag cavity and the inwardly contracted interior wall portion 90 are effective to resist axial outward movement of the bag until after the ply band has been presse dtightly against the interior of the bead ring. The wall portion 90 is bowed inwardly and stiffened by contraction in the vulcanizing mold and the inflation pressure initially applied tends to decrease the curvature of the portion 90 and press the inner edge thereof toward the drum and delay the outward movement of the bag. After the bag has pressed the ply band has been pressed tightly against the interior of pull on the portion of the bag wall in engagement with the ply band rapidly increases, so that a strong axial outward pull is exerted on the ply band. In order to prevent slippage between the bag wall and the ply band the bag wall is provided with a slip resistant surface. Such a surface may be provided by molding suitable protuberances in the rubber covering of the exterior wall such as the parallel circumferential ribs 101.

Figure 14:
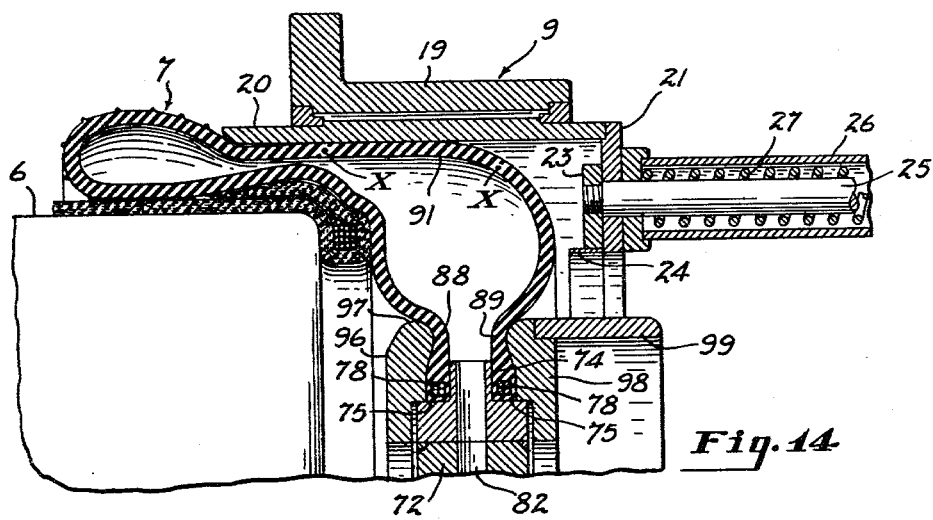
Figure 15:
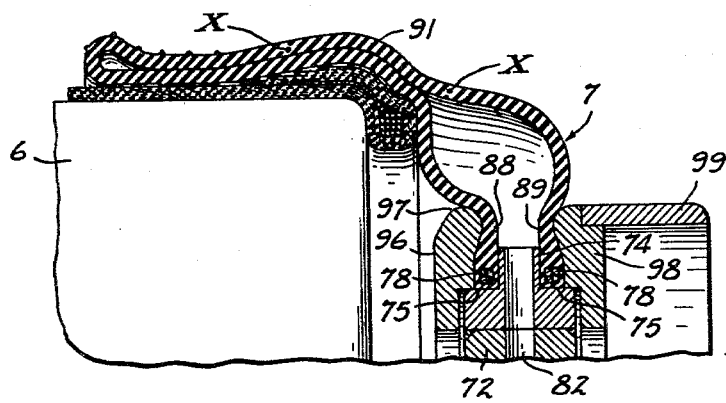

The axial outward pull on the ply band while the band is being expanded outwardly of the bead ring to a diameter greater than that of the bead ring shifts the bag axially outwardly as shown in FIG. 12. The simultaneous inflation of the bags at opposite ends of the drum causes the band to be drawn tightly against the drum periphery to firmly unite the superposed plies of the band. Upon further expansion of the bag the portion 91 of the bag wall is shifted radially outwardly and axially inwardly to a position where it exerts much less resistance to axial inward movement of the bag and the bag is shifted axially toward the drum and presses the ply band against the outer face of the bead ring as shown in FIG. 13. After the full inflation pressure is applied the bag engaging sleeve 20 is shifted axially toward the drum and into engagement with the bag 7 by means of the fluid pressure cylinder 28 to force the bag over the drum shoulder as shown in FIG. 14. The two sleeves 20 are preferably operated simultaneously by means of the two fluid pressure cylinders 28 and 30 and air is supplied to or exhausted from the pressure supply passage 86 to inflate or deflate the turnover bags 7 and 8 by means of a suitable valve that may be connected to the passage 86 by suitable means such as a non-rotatable sleeve, not shown, on the shaft 3. The rate of escape of air from the bags regulates the rate of movement of the fluid actuated sleeves so that the pressure is maintained to press the bag tightly against the drum periphery and against the interior of the sleeves while the bags are being forced over the drum periphery to the position shown in FIG. 14 where the portion of the bag overlying the drum is confined in a restricted annular space surrounding the drum periphery. After the axial inward movement of the sleeve 19 is stopped the pressure within the bag may be quickly released and the portion of the bag engaging the interior of the sleeve and overlying the drum periphery snaps down into engagement with the portion of the bag that contacts the ply band on the drum as shown in FIG. 15. When the bag is positioned as shown in FIG. 14, the externally ribbed portion of the bag wall is in engagement with the ply band on the drum periphery and with the interior of the turnover sleeve 19 so that slippage of the bag wall with respect either to the ply band or to the interior of the sleeve 19 is effectively resisted. Also the portion 91 of the bag wall in which the maximum energy is stored due to stretching is positioned over the drum periphery. During final release of pressure a portion of the ribbed face of the bag is held tightly against the ply band by the contractile force created by stretching to prevent slippage while the portion of the bag wall overlying it is collapsed into engagement therewith. The contractile force of the portion of the bag collapsed on the drum applies a uniform pressure on the turned back end of the ply band throughout its circumference to firmly adhere the same to the body of the band. After retraction of the sleeve, the bag may be disengaged from the drum by simply introducing air under pressure sufficient to expand the bag radially and cause it to snap back to its original position beyond the end of the drum.

It is to be understood that in accordance with the provisions of the patent statutes, variations and modifications of the specific devices herein shown and described may be made without departing from the spirit of the invention.

What we claim is:

1. The herein described method of applying a bead ring to an end of a ply band that overlies an end shoulder of a tire building drum which comprises pressing a bead ring axially against the portion of the ply band overlying said drum shoulder, expanding an annular inflatable air bag against the portion of the ply band within the interior of the bead ring, the maximum diameter of said bag in its relaxed condition being less than the maximum diameter of said drum, exerting an axial outward pull on the portion of the bag engaging the ply band, expanding the portion of the bag disposed axially outwardly of the bead ring to fold the ply band radially outwardly past the outer side of the bead ring, shifting the expanded portion of the bag axially inwardly to press the ply band against the outer side of the bead ring, forcing the radially outer portion of the inflated bag axially inwardly over the drum shoulder and holding said portion against axial outward movement while rapidly deflating the bag to cause the portion of the bag surrounding the drum periphery to collapse and constrict into gripping engagement with the turned back portion of the ply band surrounding the end portion of the drum periphery to stitch the same to the portion of the band which it overlies, and releasing said bag from the drum and returning it to a position clear of the drum.

2. The method as set forth in claim 1 in which the bag is released from gripping engagement with the drum by admitting air under pressure to the interior thereof.

3. The method as set forth in claim 1 in which the radially outer portion of the inflated bag is contracted to a smaller diameter and confined in a radially restricted space around the drum periphery prior to its collapse into gripping engagement with the drum.

4. The method as set forth in claim 3 in which air is permitted to escape from the bag while the bag is being contracted and forced over the drum shoulder.

5. The combination with a tire building drum having a ply band receiving periphery and an end shoulder against which the bead receiving end of a ply band may be pressed, of an annular elastic rubber turnover bag molded and vulcanized to a shape tubular in transverse section providing a periphery of less diameter than that of the drum in its expanded condition when the ends of the ply band are folded over the beads and an axially elongated annular cavity that is enlarged and of increased radial depth adjacent its axially inner and outer edges, means reinforcing said bag to permit circumferential stretch and radial expansion upon inflation and to restrain transverse stretching, means for supporting said bag coaxially with the drum and adjacent an end thereof comprising a support and means for attaching said support to the interior of the bag between the median plane of the bag and the end of the drum, means for inflating said bag to fold the end of a ply band against the interior and outer sides of a bead ring, a bag engaging sleeve coaxial with the drum and movable axially to force the radially outer portion of the inflated bag over the end of the drum and for confining the portion of the bag surrounding the drum periphery, and means for releasing the air from the inflated bag to cause the portion of the bag surrounding the drum to collapse and constrict into gripping engagement with the drum periphery.

6. The combination set forth in claim 5 in which the bag reinforcing means comprises cords disposed at a bias angle of not more than 10° relative to a transverse plane in which the axis of the bag lies.

7. A tire building machine comprising a rotatable externally cylindrical ply band receiving drum having an end shoulder against which an end portion of a ply band may be pressed, an annular support fixed with respect to the drum and having a narrow peripheral portion adjacent an end of the drum and coaxial with the drum, an annular inflatable radially expansible ply turnover bag of axially elongated tubular form having radially spaced exterior and interior flexible wall portions, the exterior wall portion being substantially cylindrical and of less diameter than the drum in its expanded condition when the ends of the ply band are folded over the beads, the interior of said bag being attached along a circumferential line to the peripheral portion of said support with its inner edge closely adjacent the drum and with its median plane disposed axially outwardly of said line of attachment, said bag having a narrow interior wall portion adjacent the drum that is contracted radially inwardly to provide an enlargement of the bag cavity at its inner edge, means for pressing a bead ring against an end of the ply band overlying the drum shoulder outwardly of said bag, means for inflating said bag to press the ply band against the interior of the bead ring and to fold the same outwardly against the outer face of the bead ring, a cylindrical bag turnover sleeve, coaxial with the drum, of greater diameter than the drum, of less diameter than the inflated bag and movable axially from a position laterally clear of the bag to a position overlying the drum periphery to position a portion of the bag in a position surrounding the drum periphery and means for releasing the air from the inflated bag to cause the portion of the bag surrounding the drum to collapse and constrict into gripping engagement with the drum periphery.

8. A tire building machine comprising a support, a horizontal shaft mounted at one end in said support and projecting therefrom, a tire building drum supported on said shaft adjacent its free end, a bead applying annulus mounted for axial movement toward and away from the outer end of said shaft, a carriage mounted for linear movement parallel to the shaft and below the same, a bracket for supporting said annulus in a position coaxial with said drum and connected to said carriage by a horizontal pivot, an elongated vertically disposed cam plate extending parallel to said shaft and slidably mounted for endwise movement alongside said carriage and provided with an elongated horizontal slot terminating at its outer end in a downwardly curved portion, an outwardly and downwardly inclined arm rigidly attached to said bracket and having a roller that travels in said slot, the straight portion of said slot holding said bracket in a position where said annulus is coaxial with said drum, and independent means for moving said cam plate endwise to engage said roller with said curved portion of the slot to swing said bracket and annulus axially outwardly and downwardly to position said annulus below the level of said drum.

9. A tire building machine comprising a rotatable externally cylindrical ply band receiving drum having an end shoulder against which an end portion of a ply band may be pressed, means for pressing a bead ring axially against the portion of the ply band overlying said drum shoulder, an annular support fixed with respect to said drum and having a narrow peripheral portion adjacent an end of the drum and coaxial with the drum, an annular inflatable radially expansible ply turnover bag of axially elongated tubular form having radially spaced exterior and interior flexible wall portions, the exterior wall portion being substantially cylindrical and of less diameter than the drum in its expanded condition when the ends of the ply band are folded over the beads, the interior of said bag being attached along a circumferential line to the peripheral portion of said support with its inner edge closely adjacent the drum, means for expanding said bag against the portion of the ply band within the interior of the bead ring, for exerting an axial outward pull on the portion of the bag engaging the ply band and expanding the portion of the bag axially outwardly of the bead ring to pull the ply band radially outwardly past the outer face of the bead ring, a cylindrical bag turnover sleeve, coaxial with the drum, of greater diameter than the drum, of less diameter than the inflated bag and movable axially from a position laterally clear of the bag to a position overlying the drum periphery to position a portion of the inflated bag in a position surrounding the drum periphery, and means for releasing the air from the inflated bag to cause the portion of the bag surrounding the drum to collapse and constrict into gripping engagement with the drum periphery.

References Cited in the file of this patent
UNITED STATES PATENTS

| | | |
|---|---|---|
| 2,455,038 | Breth | Nov. 30, 1948 |
| 2,614,952 | Kraft | Oct. 21, 1952 |
| 3,078,204 | Appleby | Feb. 19, 1963 |